(12) United States Patent
Jeon et al.

(10) Patent No.: US 11,872,967 B2
(45) Date of Patent: Jan. 16, 2024

(54) DRUM BRAKE DEVICE FOR VEHICLE

(71) Applicant: HYUNDAI MOBIS CO., LTD., Seoul (KR)

(72) Inventors: Dae Ung Jeon, Yongin-si (KR); Moo Jin Choi, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 283 days.

(21) Appl. No.: 17/136,241

(22) Filed: Dec. 29, 2020

(65) Prior Publication Data

US 2022/0126796 A1 Apr. 28, 2022

(30) Foreign Application Priority Data

Oct. 27, 2020 (KR) .......................... 10-2020-0140396

(51) Int. Cl.
*B60T 1/06* (2006.01)
*F16D 51/12* (2006.01)
(Continued)

(52) U.S. Cl.
CPC .............. *B60T 1/067* (2013.01); *F16D 51/12* (2013.01); *F16D 51/14* (2013.01); *F16D 65/22* (2013.01);
(Continued)

(58) Field of Classification Search
CPC .......... F16D 51/12; F16D 51/14; F16D 65/22; F16D 65/40; F16D 2121/02;
(Continued)

(56) References Cited

U.S. PATENT DOCUMENTS

| 6,684,988 | B2 | 2/2004 | Kapaan et al. |
| 9,638,271 | B2 | 5/2017 | Choi |
| 2003/0038002 | A1* | 2/2003 | Kapaan .................. F16D 65/22 188/327 |
| 2010/0096224 | A1* | 4/2010 | Kim ........................ F16D 51/48 188/74 |
| 2014/0345989 | A1* | 11/2014 | Oshio .................. B60T 13/741 188/162 |

(Continued)

FOREIGN PATENT DOCUMENTS

DE 600 27 051 T2 8/2006
DE 10 2005 025 296 A1 12/2006
(Continued)

OTHER PUBLICATIONS

Office Action dated May 4, 2021, issued to German Patent Application No. 102020134962.9.

*Primary Examiner* — Robert A. Siconolfi
*Assistant Examiner* — San M Aung
(74) *Attorney, Agent, or Firm* — H.C. Park & Associates, PLC

(57) ABSTRACT

A drum brake device for a vehicle includes a first brake shoe and a second brake shoe movably coupled to a back plate, and spaced apart from each other; a wheel cylinder positioned between one end of the first brake shoe and one end of the second brake shoe, and configured to expand the distance between the one end of the first brake shoe and the one end of the second brake shoe; and an actuator positioned between another end of the first brake shoe and another end of the second brake shoe, and configured to provide a driving force to expand the distance between the one end of the first brake shoe and the one end of the second brake shoes and to expand the distance between the another end of the first brake shoe and the another end of the second brake shoe.

3 Claims, 9 Drawing Sheets

(51) Int. Cl.
*F16D 65/22* (2006.01)
*F16D 51/14* (2006.01)
*F16D 65/40* (2006.01)
*F16D 121/02* (2012.01)
*F16D 125/52* (2012.01)
*F16D 121/24* (2012.01)

(52) U.S. Cl.
CPC ........ *F16D 65/40* (2013.01); *B60T 2270/402* (2013.01); *F16D 2121/02* (2013.01); *F16D 2121/24* (2013.01); *F16D 2125/52* (2013.01)

(58) Field of Classification Search
CPC ............. F16D 2121/24; F16D 2125/40; F16D 2125/52; B60T 1/067; B60T 13/741; B60T 2270/402
USPC .......................................................... 188/326
See application file for complete search history.

(56) References Cited

U.S. PATENT DOCUMENTS

| | | | |
|---|---|---|---|
| 2016/0025171 A1* | 1/2016 | Choi | F16D 51/30 |
| | | | 188/325 |
| 2016/0152214 A1* | 6/2016 | Koga | F16D 65/09 |
| | | | 188/325 |
| 2017/0051802 A1 | 2/2017 | Choi | |
| 2017/0227078 A1* | 8/2017 | Oshio | F16D 66/00 |
| 2020/0018365 A1* | 1/2020 | Barbosa | F16D 51/24 |
| 2020/0189549 A1* | 6/2020 | Mazzarini | B60T 13/746 |

FOREIGN PATENT DOCUMENTS

| | | | | |
|---|---|---|---|---|
| KR | 10-2001-0029237 | | 4/2001 | |
| KR | 10-2015-0049725 | | 5/2015 | |
| KR | 10-1532231 | | 7/2015 | |
| KR | 10-2017-0023319 | | 3/2017 | |
| WO | WO-2020136329 A1 * | | 7/2020 | ............. B60T 1/067 |
| WO | 2020174150 | | 9/2020 | |

\* cited by examiner

# DRUM BRAKE DEVICE FOR VEHICLE

CROSS-REFERENCE TO RELATED APPLICATION

This application claims priority from and the benefit of Korean Patent Application No. 10-2020-0140396, filed on Oct. 27, 2020, which is hereby incorporated by reference for all purposes as if set forth herein.

BACKGROUND

Field

Exemplary embodiments relate to a drum brake device for a vehicle, and more particularly, to a drum brake device for a vehicle, which can improve a parking braking force.

Discussion of the Background

In general, a brake for a vehicle refers to a device which is used to decelerate or stop a vehicle in operation or maintain a parking state.

A duo-servo drum brake generates a braking force through the following process. When a lever of a driver seat is pulled, a lever of the drum brake, connected through a parking cable, is pulled to generate a boosted force, and the boosted force expands a pair of brake shoes such that the pair of brake shoes is pressed against a drum to generate a braking force. The duo-servo drum brake may generate a braking force in an L/T (Leading Trailing) type during main braking, and generate a braking force in a duo-servo type during parking braking.

An EPB (Electrical Parking Brake) for a vehicle refers to a device which electrically controls a parking brake. When a driver operates a switch, the EPB expands a pair of brake shoes using a force boosted by an actuator and screw, such that the pair of brake shoes are pressed against a drum to generate a braking force.

The EPB can perform emergency braking, and be automatically operated and released when the vehicle stops, for example, when the vehicle waits for signal. In particular, even when a driver intends to restart the vehicle after stopping the vehicle on a slope, the vehicle is not moved backwards, which makes it possible to improve the stability and convenience of the driver.

Since the duo-servo drum brake according to the related art can be driven in a duo-servo type during parking braking and provide a high parking braking force, the duo-servo drum brake can be applied to a high-load vehicle. However, the duo-servo drum brake does not have functions corresponding to the main functions of the EPB which performs emergency braking or is automatically operated and released.

As described above, the EPB according to the related art performs emergency braking control or the like. However, because the EPB performs emergency braking control or the like only in an L/T type, it is difficult to apply the EPB to a high-load vehicle. Therefore, there is a need for a drum brake device which can be applied to a high-load device while having the functions of the EPB, such as emergency braking.

The related art of the present disclosure is disclosed in Korean Patent Application No. 2015-0049725 published on May 8, 2015 and entitled "Parking Brake Device for Vehicle".

The above information disclosed in this Background section is only for enhancement of understanding of the background of the invention and, therefore, it may contain information that does not constitute prior art.

SUMMARY

Exemplary embodiments of the present inventions are directed to a drum brake device for a vehicle, which can prevent or minimize a loss of an operation force, and prevent an occurrence of torque loss.

Also, various embodiments are directed to a drum brake device for a vehicle, in which parts constituting an actuator are efficiently disposed to improve the availability of space.

In an embodiment, a drum brake device for a vehicle may include: a first brake shoe and a second brake shoe movably coupled to a back plate, and spaced apart from each other; a wheel cylinder positioned between one end of the first brake shoe and one end of the second brake shoe, and configured to expand the distance between the one ends of the first and second brake shoes; and an actuator positioned between the other end of the first brake shoe and the other end of the second brake shoe, and configured to provide a driving force to expand the distance between the one ends of the first and second brake shoes and the distance between the other ends of the first and second brake shoes.

The actuator may include: an anchor housing part; a motor part housed in the anchor housing part, and configured to generate a driving force for braking; a power transmission part configured to transmit the driving force generated by the motor part; and a push rod part having a length that is varied by the driving force transmitted by the power transmission part.

The motor part may include a motor shaft whose axial direction is parallel to the extension direction of the push rod part.

The anchor housing part may include: a motor housing part having the motor part housed therein, and extended in one direction; a rod housing part having the push rod part housed therein, and provided in parallel to the extension direction of the motor housing part; and a gear housing part having the power transmission part housed therein, and extended from the motor housing part toward the push rod part, wherein the gear housing part is disposed eccentrically to one side based on the center of the rod housing part in a longitudinal direction thereof.

The power transmission part may include: a first worm shaft coupled to the motor shaft included in the motor part, and having a first worm gear formed thereon; a first worm wheel engaged and rotated with the first worm gear; a second worm shaft disposed across the first worm shaft, and having a second worm gear formed thereon; and a second worm wheel engaged and rotated with the second worm gear, and configured to vary the length of the push rod part.

The push rod part may include: a first push rod abutting on the first brake shoe, screwed to one side of the second worm wheel, and moved in a direction to press the first brake shoe in connection with the rotation of the second worm wheel; and a second push rod abutting on the second brake shoe, connected to the other side of the second worm wheel, and pushed by the second worm wheel and moved in a direction to press the second brake shoe, when the first push rod is moved.

The second worm wheel may include: a gear engaged with the second worm shaft; a bolt screw provided on one side of the gear and screwed to the first push rod; and a rod connector provided on the other side of the gear, and connected to the second push rod.

The drum brake device may further include: an adjust assembly positioned between the one end of the first brake shoe and the one end of the second brake shoe, and configured to adjust the distance between the one ends of the first and second brake shoes; and a pivot lever rotatably provided on the back plate, having one end connected to the adjust assembly and the other end connected to the actuator, and rotated by the driving force of the actuator such that the adjust assembly expands the distance between the first and second brake shoes.

The adjust assembly may include: a moving rod moved by the pivot lever so as to press the second brake shoe; and an interlocking rod moved in connection with the moving rod, and configured to press the first brake shoe.

The pivot lever may include: a lever plate provided between the first brake shoe and the back plate, and having a lower end connected to the first push rod and an upper end connected to the adjust assembly; and a lever pin protruding from the lever plate, and disposed through the first brake shoe, wherein the lever plate is pressed by the first push rod and rotated about the lever pin so as to move the moving rod in a direction to press the second brake shoe.

In accordance with the embodiment of the present disclosure, the drum brake device for a vehicle can minimize a loss of the operation force of the actuator during a braking operation by the actuator while the distance between the one ends of the first and second brake shoes is expanded by the operation of the wheel cylinder.

Furthermore, when a driver releases the brake pedal to lower the hydraulic pressure by the wheel cylinder, the drum brake device may maintain the state in which the one ends of the first and second brake shoes are spread, thereby preventing an occurrence of torque loss.

Furthermore, as the parts constituting the actuator in the drum brake device are efficiently disposed, the actuator may be easily installed even in a narrow or limited space. It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
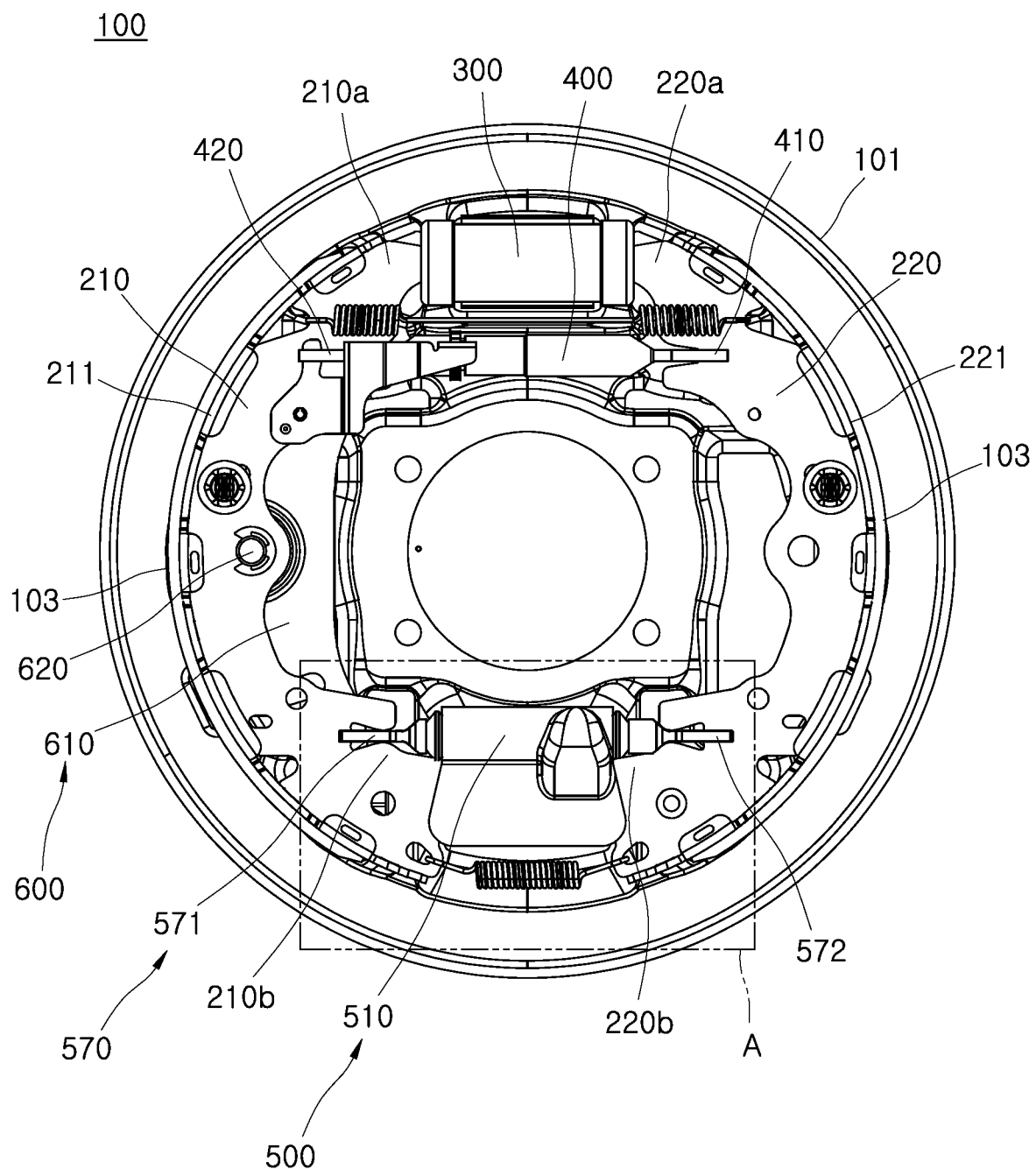
FIG. 1 is a front view illustrating a drum brake device for a vehicle in accordance with an embodiment of the present disclosure.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Hereinafter, a brake device for a vehicle will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 2:
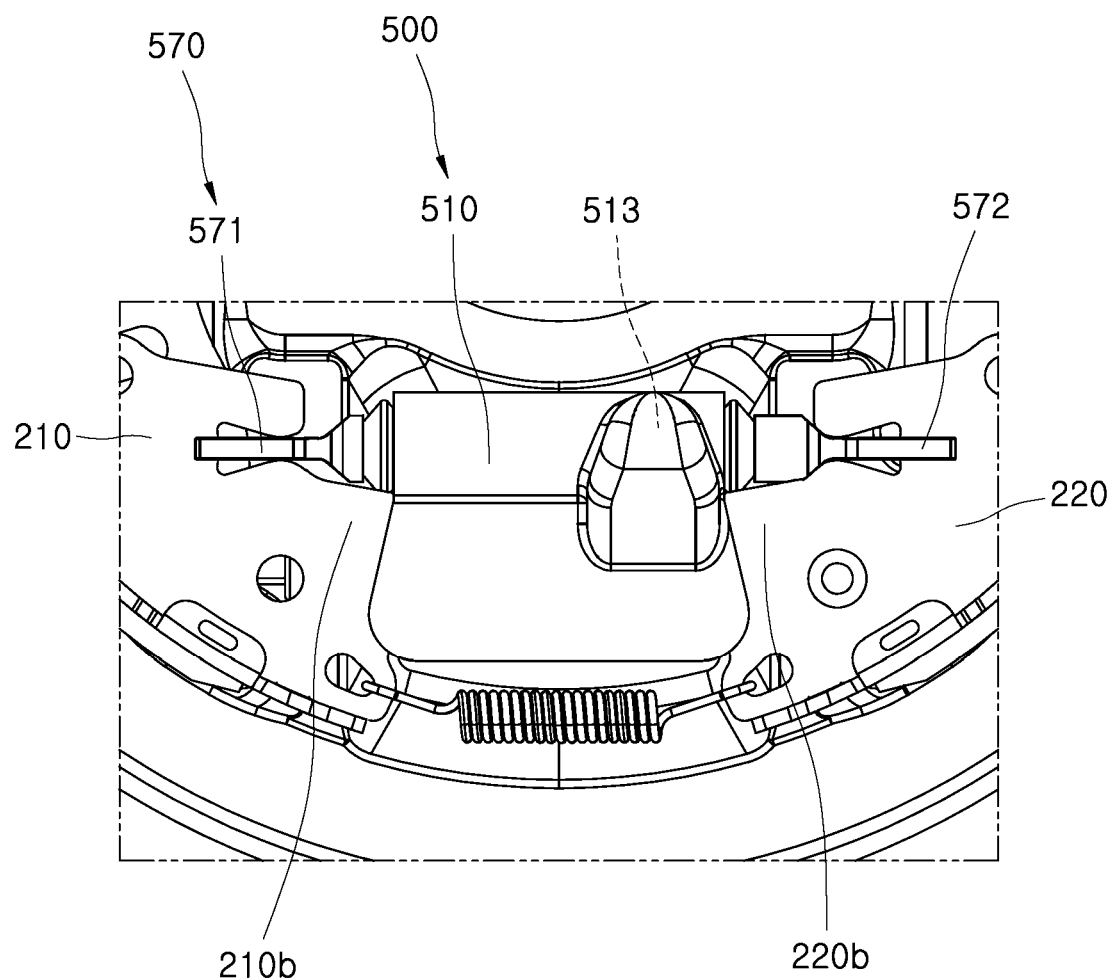
FIG. 2 is an expanded view of a portion A of FIG. 1.
Figure 3:
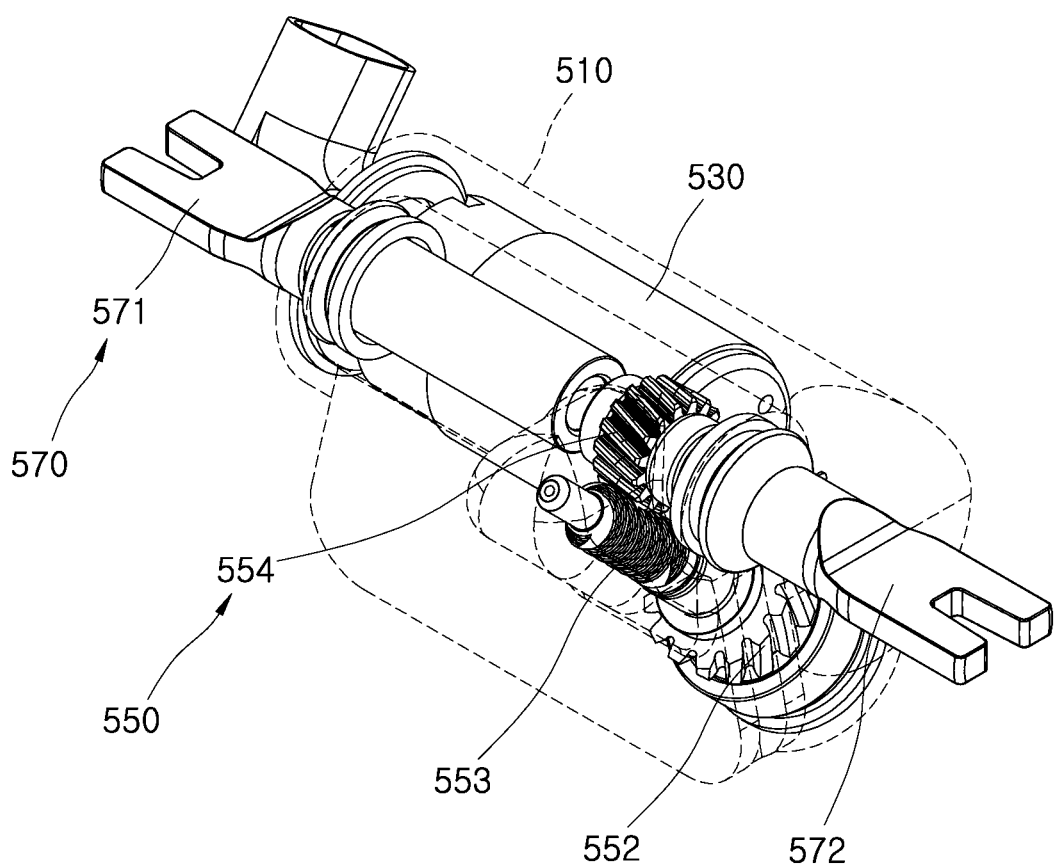
FIG. 3 is a perspective view illustrating an actuator in accordance with the embodiment of the present disclosure.
Figure 4:
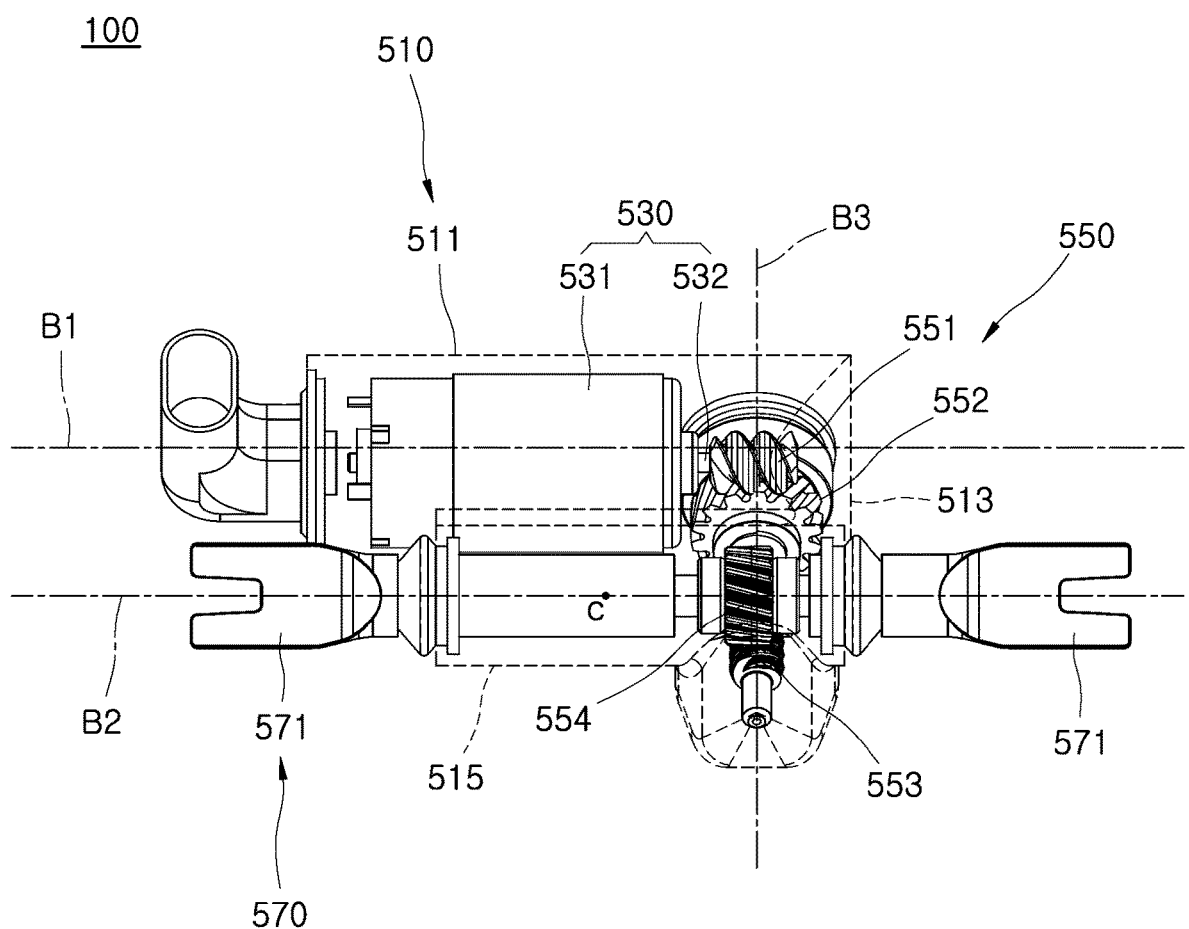
FIG. 4 is a view seen from the top in FIG. 3.
Figure 5:
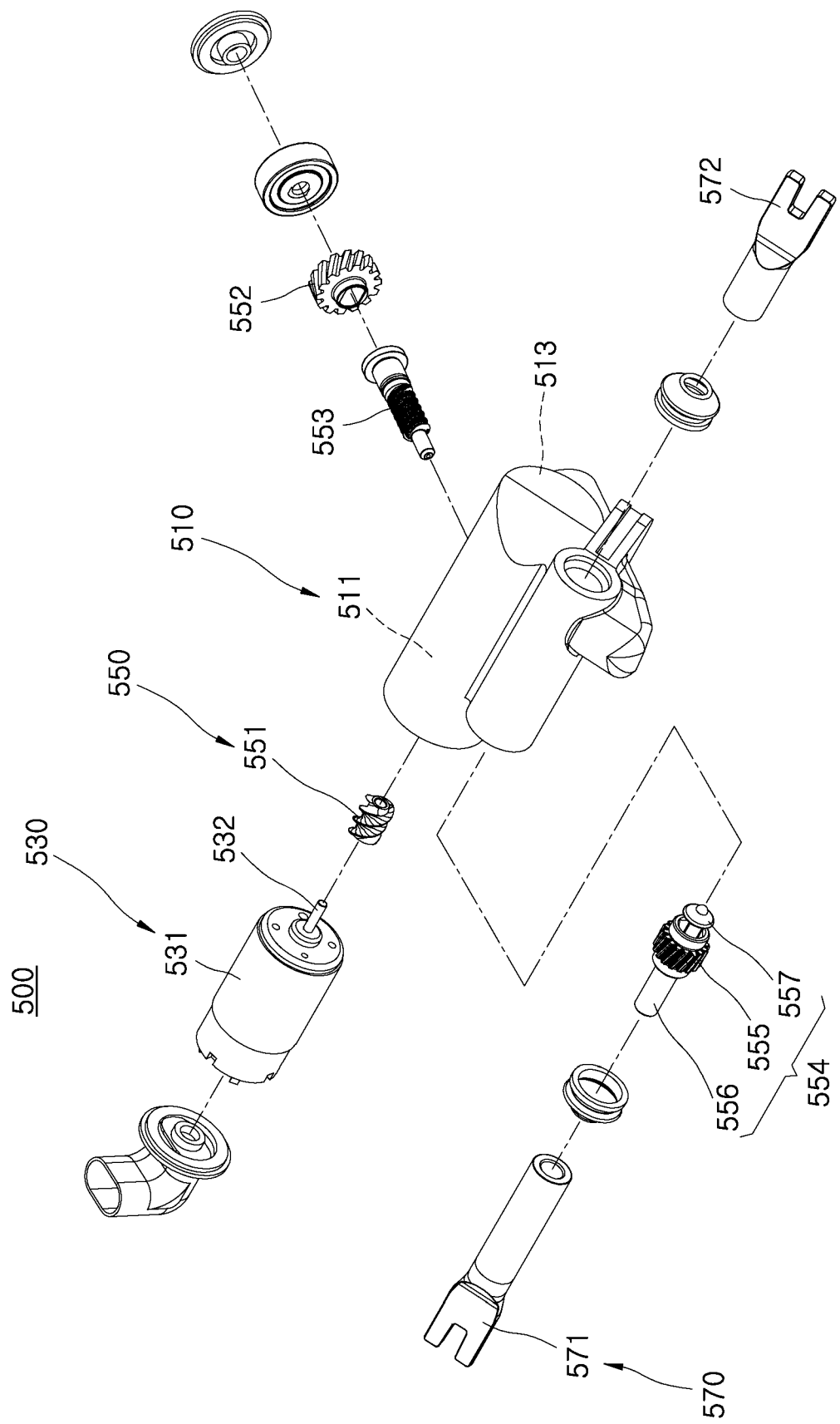
FIG. 5 is an expanded view of FIG. 3.
Figure 6:
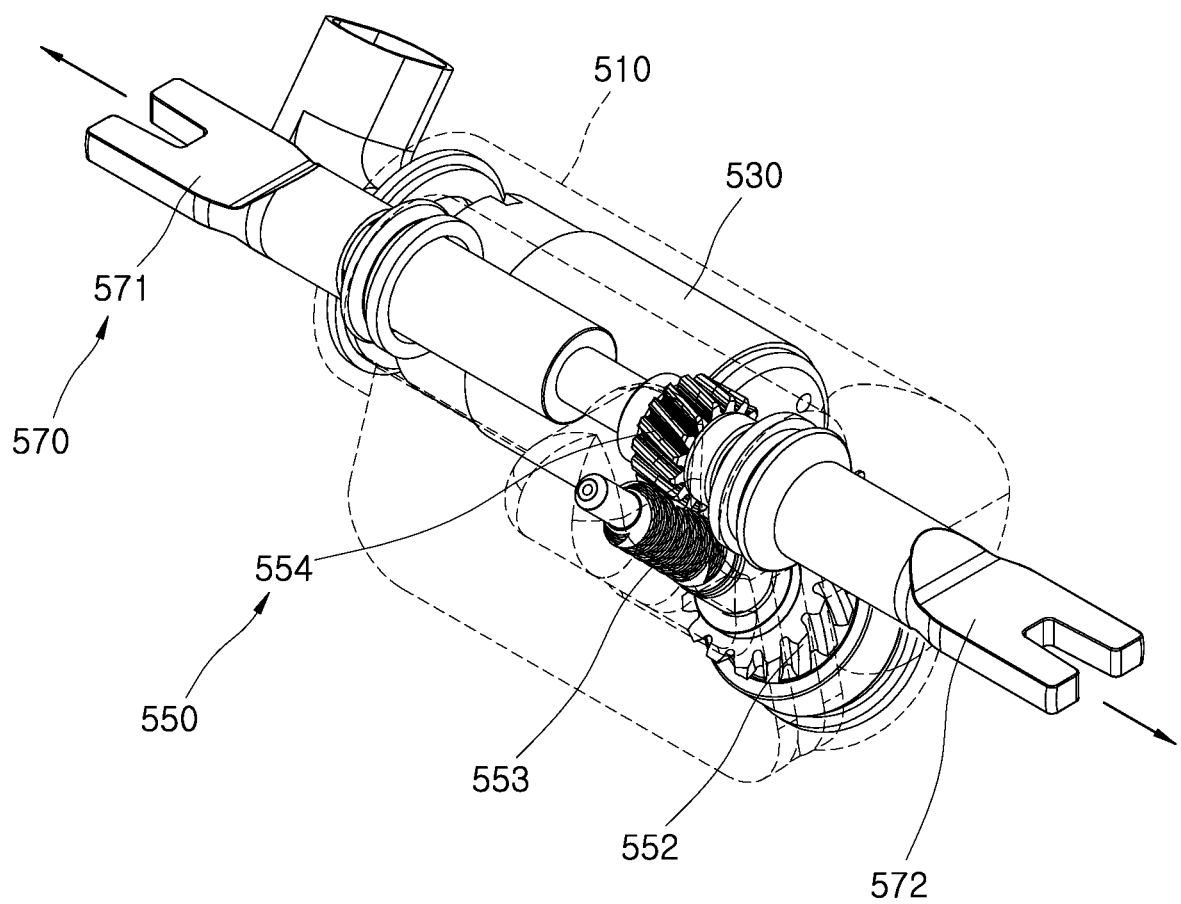
FIG. 6 is a view illustrating that the length of a push rod part in FIG. 3 is varied.
Figure 7:
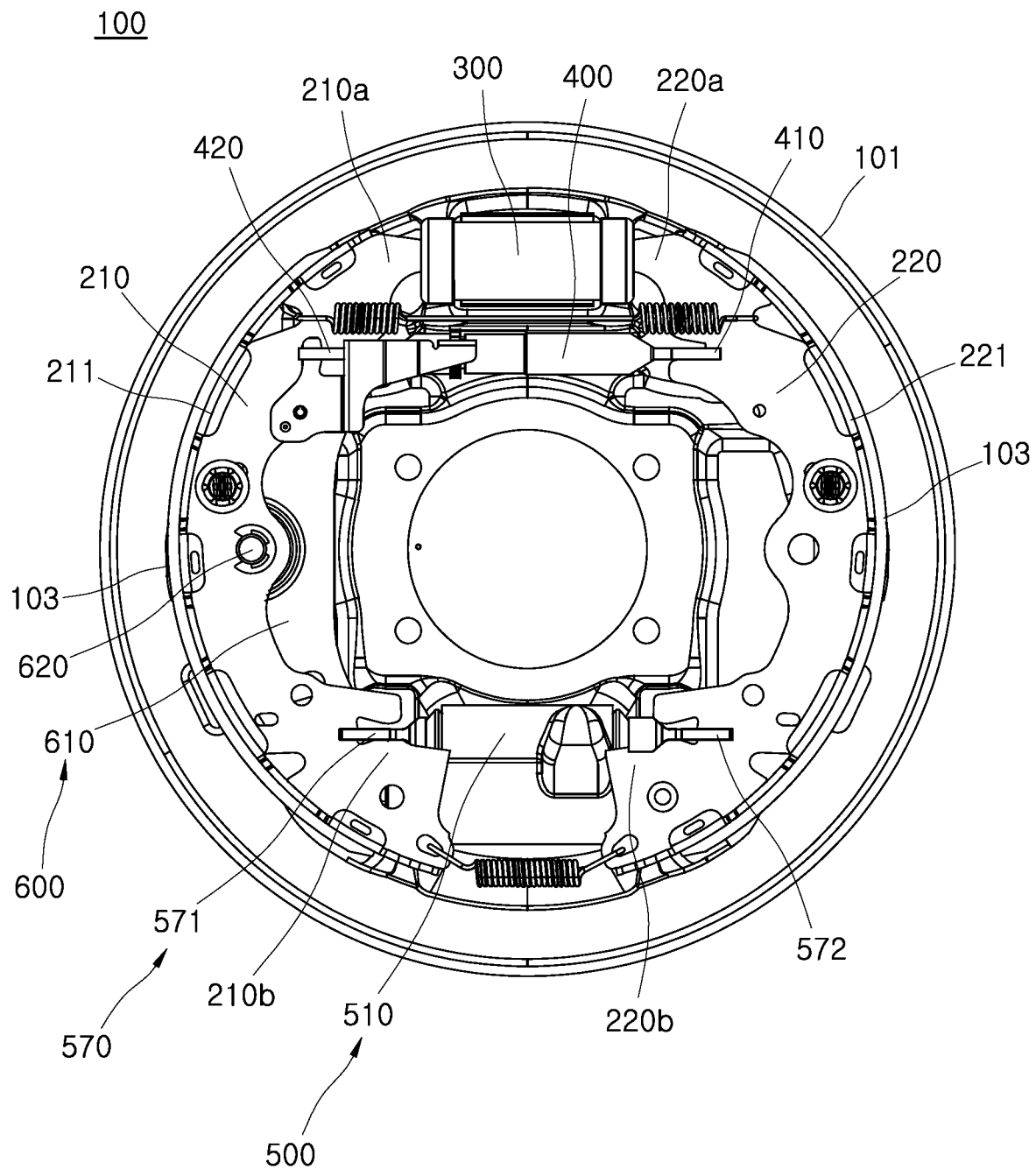
FIG. 7 is a view illustrating that the distance between first and second brake shoes is expanded by a wheel cylinder in FIG. 1.
Figure 8:
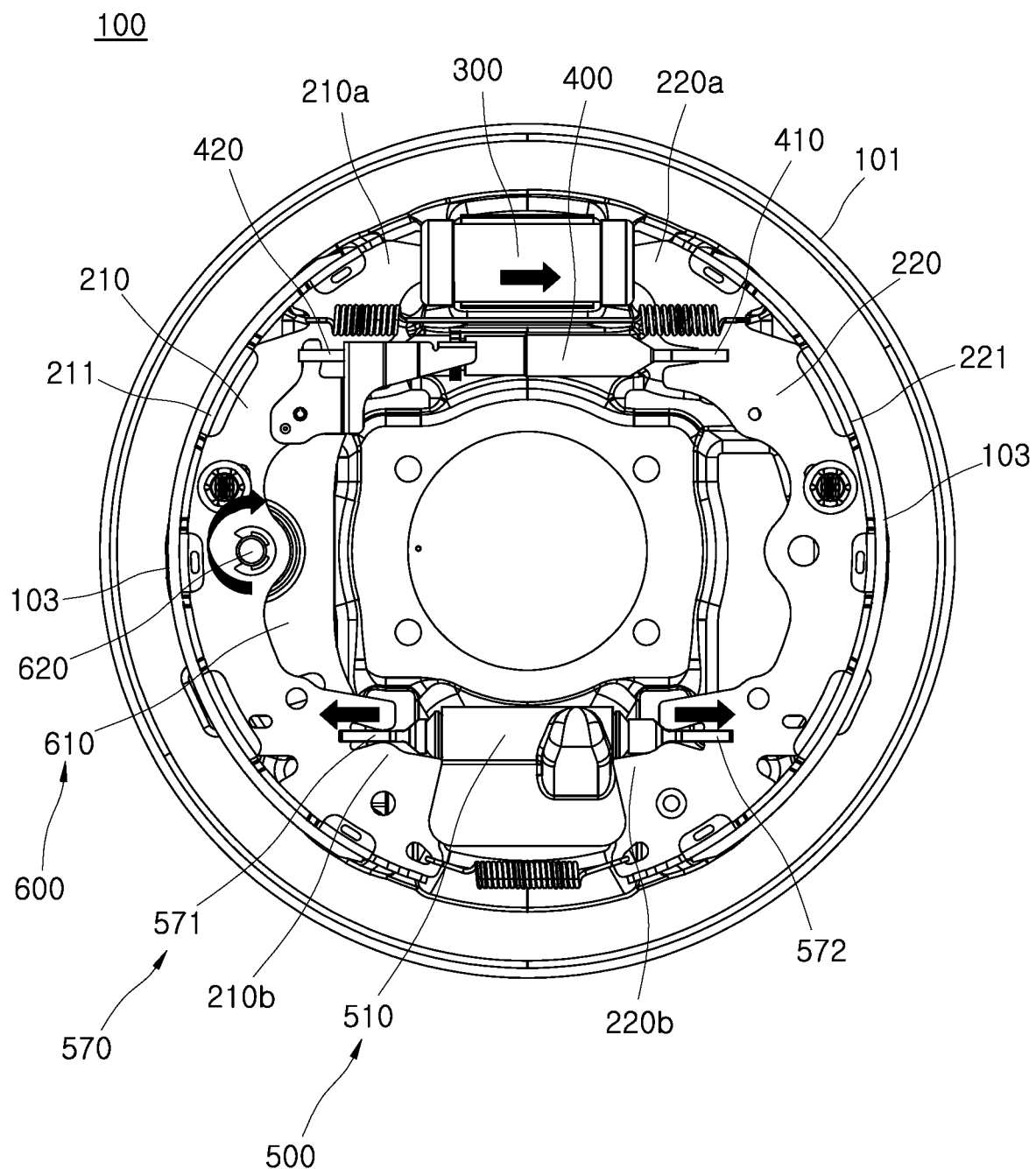
FIG. 8 and FIG. 9 are views illustrating an operation state by the actuator in FIG. 7.
Figure 9:
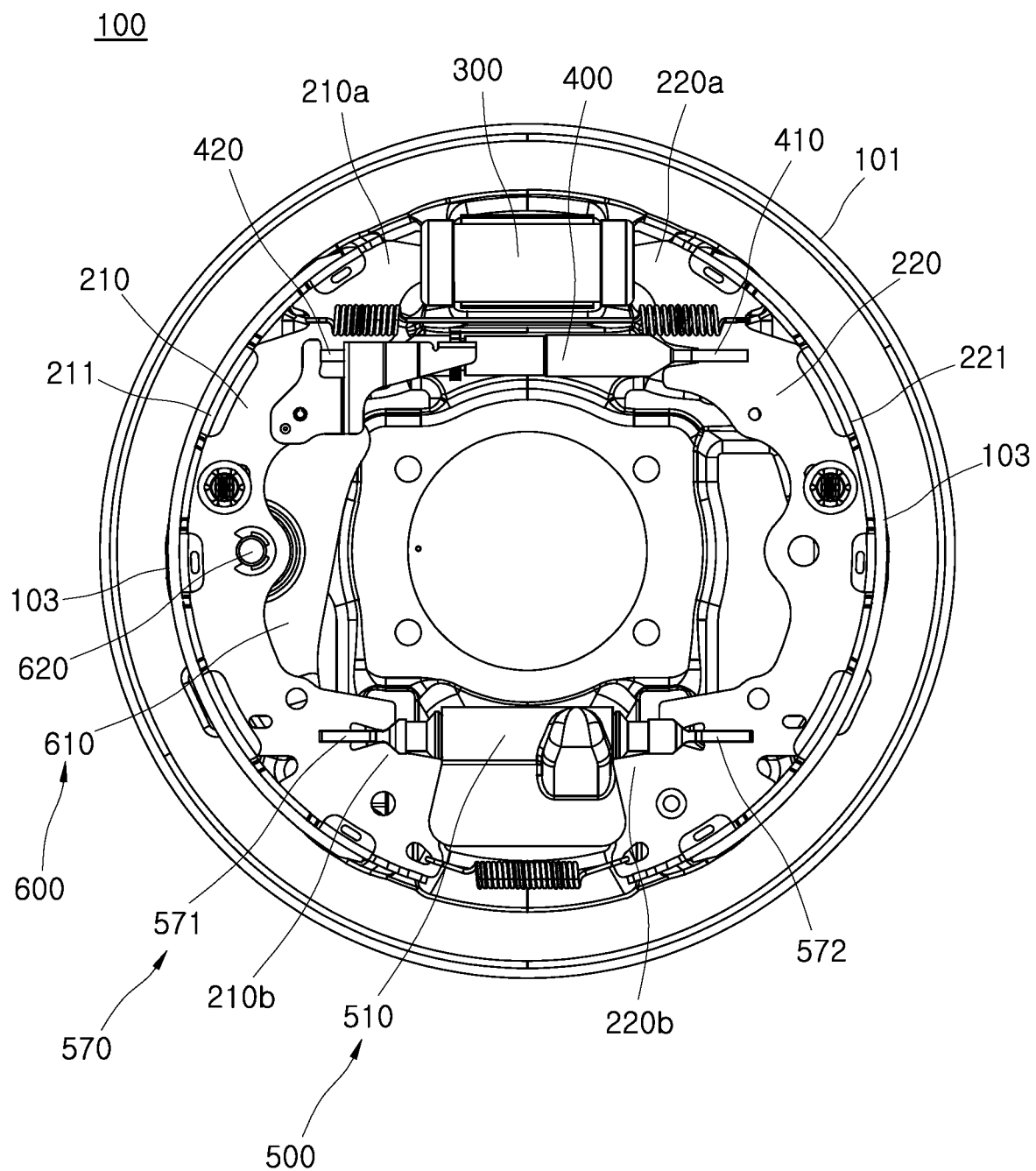

FIG. 1 is a front view illustrating a drum brake device for a vehicle in accordance with an embodiment of the present disclosure, FIG. 2 is an expanded view of a portion A of FIG. 1, FIG. 3 is a perspective view illustrating an actuator in accordance with the embodiment of the present disclosure, FIG. 4 is a view seen from the top in FIG. 3, FIG. 5 is an expanded view of FIG. 3, FIG. 6 is a view illustrating that the length of a push rod part in FIG. 3 is varied, FIG. 7 is a view illustrating that the distance between first and second brake shoes is expanded by a wheel cylinder in FIG. 1, and FIGS. 8 and 9 are views illustrating an operation state by the actuator in FIG. 7.

Referring to FIGS. 1 to 9, a drum brake device 100 for a vehicle in accordance with an embodiment of the present disclosure includes a first brake shoe 210, a second brake shoe 220, a wheel cylinder 300 and an actuator 500.

The first brake shoe 210 and the second brake shoe 220 may be movably coupled to a back plate 101 through a pin, clip or the like, and spaced apart from each other. For example, the first and second brake shoes 210 and 220 may be formed in a circular arc shape which is convex toward the inner circumferential surface of a drum 103, have liners 211 and 221 attached to surfaces facing the drum 103, respectively, and increase frictional forces generated between a drum 103 and the first and second brake shoes 210 and 220.

The wheel cylinder 300 is positioned between one end 210a of the first brake shoe 210 and one end 220a of the second brake shoe 220, and provided to expand the distance between the one end 210a of the first brake shoe 210 and the one end 220a of the second brake shoe 220. The one ends 210a and 220a the first and second brake shoes 210 and 220 may be upper ends based on FIG. 1, and other ends of the first and second brake shoes 210 and 220 may be lower ends 210b and 220b illustrated in FIG. 1.

The wheel cylinder 300 may include a cylinder rod (not illustrated) whose internal hydraulic pressure is varied according to a brake pedal operation of a driver, and adjust the distance between the one ends 210a and 220a of the first and second brake shoes 210 and 220. The cylinder rod may abut on the first and second brake shoes 210 and 220. When the internal hydraulic pressure of the cylinder rod is raised, the cylinder rod may expand the distance between the first and second brake shoes 210 and 220 while the length thereof is varied.

The actuator 500 is positioned between the other end 210b of the first brake shoe 210 and the other end 220b of the second brake shoe 220, and provides a driving force to expand the distance between the one ends 210a and 220a of the first and second brake shoes 210 and 220 and the distance between the other ends 220a and 220b of the first and second brake shoes 210 and 220.

Specifically, the actuator 500 may expand the distance between the other end 210b of the first brake shoe 210 and the other end 220b of the second brake shoe 220, and expand the distance between the one end 210a of the first brake shoe 210 and the one end 220a of the second brake shoe 220 in connection with the expansion of the distance between the other ends 210b and 220b. That is, while the distance between the other end 210b of the first brake shoe 210 and the other end 220b of the second brake shoe 220 is expanded by the driving force of the actuator 500, the other ends 210b and 220b may be pressed against the drum 103. Simultaneously, the state in which the distance between the one end 210a of the first brake shoe 210 and the one end 220a of the second brake shoe 220 is expanded may be maintained.

Thus, the operation of the wheel cylinder 300 may minimize a loss of the operation force of the actuator 500 during a braking operation by the actuator 500, while the distance between the one ends 210a and 220a of the first and second brake shoes 210 and 220 is expanded.

Furthermore, when the driver releases a brake pedal to lower the hydraulic pressure by the wheel cylinder 300, the state in which the one ends 210a and 220a of the first and second brake shoes 210 and 220 are spread may be maintained to prevent a torque loss.

Furthermore, the drum brake device in accordance with the embodiment of the present disclosure may include both of the wheel cylinder 300 and the actuator 500. That is, the drum brake device may be configured in such a way that the duo-servo drum brake device and the EPB according to the related art are combined, and thus secure a sufficient parking braking force. Therefore, it is possible to implement an EPB which can be applied even to a high-load vehicle.

The actuator 500 may include an anchor housing part 510, a motor part 530, a power transmission part 550 and a push rod part 570.

The anchor housing part 510 may be positioned between the other end 210b of the first brake shoe 210 and the other end 220b of the second brake shoe 220, and have a housing space therein.

The motor part 530 may be housed in the anchor housing part 510, and generate a driving force configured for braking. The motor part 530 may include a motor 531 and a motor shaft 532.

The power transmission part 550 may be configured to transmit the driving force generated by the motor part 530. For example, the power transmission part 550 may include a plurality of gears connected to the motor shaft 532, and reduce the driving force of the motor 531 to transmit the reduced driving force.

The push rod part 570 may have a length that is varied by the driving force transmitted by the power transmission part 550. Specifically, the push rod part 570 may include a first push rod 571 and a second push rod 572, which are coaxially disposed and connected to the other ends of the first and second brake shoes 210 and 220. The push rod part 570 may be configured to receive the driving force of the motor part 530 from the power transmission part 550, and adjust the distance between the first and second push rods 571 and 572.

The axial direction of the motor shaft 532 included in the motor part 530 may be set parallel to the extension direction of the push rod part 570.

Specifically, the anchor housing part 510 in accordance with the embodiment of the present disclosure may be disposed in such a manner that the axial direction B1 of the motor part 530 is parallel to the extension direction of the push rod part 570, i.e. a longitudinal direction B2 (see FIG. 4). That is, the extension directions of the motor shaft 532 and the push rod part 570 may be set to the same directions. Such an efficient arrangement can reduce the size of the anchor housing part 510 configured to house the motor part 530 and the push rod part 570. Thus, the availability of the space for the parts of the drum brake may be raised.

The anchor housing part 510 may include a motor housing part 511, a gear housing part 513 and a rod housing part 515.

The motor housing part 511 may be extended in one direction, and have the motor part 530 housed therein.

The rod housing part 515 may be disposed in parallel to the extension direction of the motor housing part 511, and have the push rod part 570 housed therein. That is, as described above, the motor housing part 511 and the rod housing part 515 may be disposed in such a manner that the axial direction of the motor shaft 532 and the longitudinal direction of the push rod part 570 are parallel to each other.

The gear housing part 513 may be extended from the motor housing part 511 toward the push rod part 570, and have the power transmission part 550 housed therein. That is, the gear housing part 513 may be disposed in a direction B3 perpendicular to the axial direction of the motor shaft 532 and the longitudinal direction of the push rod part 570. That is, the motor housing part 511, the rod housing part 515 and the gear housing part 513 may be set to places in which the motor part 530, the push rod part 570 and the power transmission part 550 are housed inside the anchor housing part 510.

The gear housing part 513 may be disposed eccentrically to any one side based on the center of the rod housing part 515 in the longitudinal direction thereof.

For example, the gear housing part 513 may be positioned eccentrically to the right side (based on FIG. 4) in the longitudinal direction from the center C of the rod housing part 515. Because the power transmission part 550 of the actuator 500, including a plurality of gears, is disposed eccentrically to one side inside the anchor housing part 510, the parts may be efficiently disposed inside the narrow anchor housing part 510.

Specifically, the power transmission part 550 may include a first worm shaft 551, a first worm wheel 552, a second worm shaft 553 and a second worm wheel 554.

The first worm shaft 551 may be coupled to the motor shaft 532 installed in the motor part 530, and have a first worm gear formed thereon.

The first worm wheel 552 may be rotatably engaged with the first worm gear, and the second worm shaft 553 may be disposed across the first worm shaft 551 and have a second worm gear formed thereon. That is, the second worm shaft may be disposed perpendicular to the first worm shaft, and coupled to the first worm wheel 552. When the first worm wheel 552 engaged with the first worm shaft 551 is rotated, the second worm shaft may be rotated together.

The second worm wheel 554 may be engaged and rotated with the second worm gear, thereby varying the length of the push rod part 570. That is, the second worm wheel 554 may receive the driving force of the motor part 530 through the first worm shaft 551, the first worm wheel 552 and the second worm shaft 553, and vary the length of the push rod part 570 using the received driving force.

The push rod part 570 may include a first push rod 571 and a second push rod 572.

The first push rod 571 may be disposed to abut on the first brake shoe 210, and screwed to one side of the second worm wheel 554. In connection with the rotation of the second worm wheel 554, the first push rod 571 may be moved in a direction to press the first brake shoe 210.

The second push rod 572 may be disposed to abut on the second brake shoe 220, and connected to the other side of the second worm wheel 554. When the first push rod 571 is moved, the second push rod 572 may be pushed by the second worm wheel 554 and moved in a direction to press the second brake shoe 220.

The second worm wheel 554 may include a gear 555, a bolt screw 556 and a rod connector 557.

The gear 555 may be engaged with the second worm shaft 553. The bolt screw 556 may be provided on one side of the gear 555, and screwed to the first push rod 571. The rod connector 557 may be provided on the other side of the gear 555, and connected to the second push rod 572.

Hereafter, an operation mechanism of the actuator will be described with reference to the above-described configuration.

When the motor part 530 is operated, the first worm shaft 551 coupled to the motor shaft 532 may be rotated, and the first worm wheel 552 engaged with the first worm shaft 551 may be rotated. When the first worm wheel 552 is rotated, the second worm shaft 553 coupled to the first worm wheel 552 may be rotated. In connection with the rotation of the second worm shaft 553, the second worm wheel 554 engaged with the second worm shaft 553 may be rotated.

When the gear 555 of the second worm wheel 554 is engaged and rotated with the second worm shaft 553, the bolt screw 556 may move the first push rod 571 screwed thereto. At this time, the other end 210b of the first brake shoe 210 may be pressed against the drum 103.

While the first push rod 571 is moved, the second worm wheel 554 screwed to the first push rod 571 may be moved toward the second push rod 572. Thus, the rod connector 557 may press the second push rod 572. At this time, the second brake shoe 220 may be pressed against with the drum 103 by the second push rod 572. Thus, a braking force may be generated.

The drum brake device in accordance with the embodiment of the present disclosure may further include an adjust assembly 400 and a pivot lever 600.

The adjust assembly 400 may be positioned between the one end 210a of the first brake shoe 210 and the one end 210b of the second brake shoe 220, and adjust the distance between the one end 210a of the first brake shoe 210 and the one end 220a of the second brake shoe 220.

That is, the adjust assembly 400 may have a variable length to adjust a gap between the one end 210a of the first brake shoe 210 and the one end 220a of the second brake shoe 220.

The adjust assembly 400 may include a moving rod 410 and an interlocking rod 420.

The moving rod 410 may be moved by the pivot lever 600 and press the second brake shoe 220. The interlocking rod 420 may be moved in connection with the moving rod 410, and press the first brake shoe 210.

The pivot lever 600 may be rotatably provided on the back plate 101 and have one end connected to the adjust assembly 400 and the other end connected to the actuator 500. While the pivot lever 600 is rotated by the driving force of the actuator 500, the adjust assembly 400 may expand the distance between the first and second brake shoes 210 and 220.

Specifically, the pivot lever 600 may include a lever plate 610 and a lever pin 620.

The lever plate 610 may be provided between the first brake shoe 210 and the back plate 101, and have a lower end connected to the first push rod 571 and an upper end connected to the adjust assembly 400. The lever pin 620 may protrude from the lever plate 610 through the first brake shoe 210.

Specifically, the lever plate 610 may be formed in a plate shape and interposed between the first brake shoe 210 and the back plate 101. The lever pin 620 may protrude from the central region of the lever plate 610 so as to be rotatably disposed through the first brake shoe 210. When the lever plate 610 is pressed by the first push rod 571, the lever plate 610 may be pivoted about the lever pin 620.

While the lever plate 610 is pressed by the first push rod 571 and pivoted about the lever pin 620, the lever plate 610 may move the moving rod 410 in a direction to press the second brake shoe 220.

At this time, in connection with the movement of the moving rod 410, the interlocking rod 420 may be moved in a direction to press the first brake shoe 210. Thus, the distance between the one end 210a of the first brake shoe 210 and the one end 220a of the second brake shoe 220 may be expanded. In particular, even after the hydraulic pressure of the wheel cylinder 300 is removed, the state in which the distance between the one ends 210a and 220a of the first and second brake shoes 210 and 220 is expanded by the operation of the actuator 500 may be maintained.

Hereafter, the operation and effect of the drum brake device for a vehicle in accordance with the embodiment of the present disclosure will be described with reference to FIGS. 1 and 7 to 9.

First, when a driver steps on the brake pedal at the initial stage illustrated in FIG. 1, the hydraulic pressure of the wheel cylinder 300 may be raised to expand the distance between the one end 210a of the first brake shoe 210 and the one end 220a of the second brake shoe 220 (see FIG. 7). Thus, the first and second brake shoes 210 and 220 may be pressed against the drum 103 and supported by the anchor housing part 510. During this process, torque may be generated to complete the main braking of the vehicle.

Then, when the actuator 500 is operated, the motor part 530 may be operated to expand the distance between the other ends 210b and 220b of the first and second brake shoes 210 and 220. At this time, the one ends 210a and 220a and the other ends 210b and 220b of the first and second brake shoes 210 and 220 may be interlocked by the pivot lever 600, which makes it possible to minimize a loss of the operation force of the actuator 500.

Specifically, when the pivot lever 600 is not provided, the actuator 500 needs to be operated by a force equal to or higher than the torque generated by the wheel cylinder 300, in order to expand the distance between the other ends 210b and 220b of the first and second brake shoes 210 and 220 while the distance between the one ends 210a and 220a thereof is expanded. In this case, the operation force may be lost. Therefore, the drum brake device for a vehicle in accordance with embodiments of the present disclosure may minimize a loss of the operation force of the actuator 500 through the interlocking structure by the pivot lever 600.

Referring to FIGS. 8 and 9, the distance between the other ends 210b and 220b of the first and second brake shoes 210 and 220 may be expanded by the actuator 500, and the distance between the one ends 210a and 220a of the first and second brake shoes 210 and 220 may be expanded by the interlocking structure through the pivot lever 600. Such an operation may minimize a torque loss which may occur when the hydraulic pressure of the wheel cylinder 300 is released.

Specifically, when the driver releases the brake pedal after the vehicle is completely braked on a slope by the wheel cylinder 300 and the actuator 500 in the case that the pivot lever 600 is not provided, the distance between the first and second brake shoes 210 and 220 may be reduced and returned to the original state while the hydraulic pressure of the wheel cylinder 300 is released. That is, while the state in which the one ends 210a and 220a and the other ends 210b and 220b of the first and second brake shoes 210 and 220 are brought into contact with the drum 103 transitions to the state in which only the other ends 210b and 220b of the first and second brake shoes 210 and 220 are brought into contact with the drum 103, a torque loss may occur. In this case, the vehicle may slip on a slope. As such, when the pivot lever 600 is not provided, a torque loss may occur while the hydraulic pressure of the wheel cylinder 300 is released.

The drum brake device for a vehicle in accordance with embodiments of the present disclosure may include the pivot lever 600 to maintain the state in which the distance between the one ends 210 and 220a of the first and second brake shoes 210 and 220 is expanded by the operation of the actuator 500. Thus, although the hydraulic pressure of the wheel cylinder 300 is released after the driver releases the brake pedal, a torque loss may be minimized to prevent a problem such as a slip of the vehicle.

As such, the drum brake device for a vehicle in accordance with the embodiment of the present disclosure can minimize a loss of the operation force of the actuator during a braking operation by the actuator while the distance between the one end 210a of the first brake shoe 210 and the one end 220a of the second brake shoe 220 is expanded by the operation of the wheel cylinder.

Furthermore, when a driver releases the brake pedal to lower the hydraulic pressure by the wheel cylinder, the drum brake device may maintain the state in which the one end 210a of the first brake shoe 210 and the one end 220a of the second brake shoe 220 are spread, thereby preventing an occurrence of torque loss.

Furthermore, as the parts constituting the actuator in the drum brake device are efficiently disposed, the actuator may be easily installed even in a narrow or limited space.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A drum brake device for a vehicle, comprising:
   a first brake shoe and a second brake shoe movably coupled to a back plate, and spaced apart from each other;
   a wheel cylinder positioned between one end of the first brake shoe and one end of the second brake shoe, and configured to expand the distance between the one end of the first brake shoe and the second brake shoe; and
   an actuator positioned between another end of the first brake shoe and another end of the second brake shoe, and configured to provide a driving force to expand the distance between the one end of the first brake shoe and the one end of the second brake shoe and to expand the distance between the another end of the first brake shoe and the another end of the second brake shoe,
   wherein the actuator comprises:
   an anchor housing part;
   a motor part housed in the anchor housing part, and configured to generate a driving force configured for braking;
   a power transmission part configured to transmit the driving force generated by the motor part; and
   a push rod part having a length that is varied by the driving force transmitted by the power transmission part,
   wherein the anchor housing part comprises:
   a motor housing part having the motor part housed therein, and extended in one direction;
   a rod housing part having the push rod part housed therein, and provided in parallel to the extension direction of the motor housing part; and
   a gear housing part having the power transmission part housed therein, and extended from the motor housing part toward the push rod part,
   wherein the motor housing part and the rod housing part are disposed to face each other, and
   wherein the gear housing part is disposed eccentrically to one side based on the center of the rod housing part in a longitudinal direction thereof,
   wherein the power transmission part comprises:
   a first worm shaft coupled to a motor shaft included in the motor part, and having a first worm gear formed thereon;
   a first worm wheel engaged and rotated with the first worm gear;
   a second worm shaft disposed across the first worm shaft, and having a second worm gear formed thereon; and
   a second worm wheel engaged and rotated with the second worm gear and configured to vary the length of the push rod part,
   wherein the push rod part comprises:
   a first push rod abutting on the first brake shoe, screwed to one side of the second worm wheel, and moved in a direction to press the first brake shoe in connection with the rotation of the second worm wheel; and
   a second push rod abutting on the second brake shoe, connected to the other side of the second worm wheel, and pushed by the second worm wheel and moved in a direction to press the second brake shoe, when the first push rod is moved,
   wherein the second worm wheel comprises:
   a gear engaged with the second worm shaft;
   a bolt screw provided on one side of the gear and screwed to the first push rod; and
   a rod connector provided on an opposite side of the gear and connected to the second push rod,
   the drum brake device further comprising:
   an adjust assembly positioned between the one end of the first brake shoe and the one end of the second brake shoe, and configured to adjust the distance between the one end of the first brake shoe and the one end of second brake shoe; and
   a pivot lever rotatably provided on the back plate, having one end of the pivot lever connected to the adjust assembly and another end of the pivot lever connected to the actuator, wherein the pivot lever is rotated by the driving force of the actuator such that the adjust assembly expands the distance between the first brake shoe and the second brake shoe, wherein the adjust assembly comprises:
- a moving rod moved by the pivot lever so as to press the second brake shoe; and
- an interlocking rod moved in connection with the moving rod and configured to press the first brake shoe, wherein the pivot lever comprises:
- a lever plate provided between the first brake shoe and the back plate, and having a lower end connected to the first push rod and an upper end connected to the adjust assembly; and
- a lever pin protruding from a central region of the lever plate so as to be rotatably disposed through the first brake shoe, and disposed through the first brake shoe, wherein the lever plate is pressed by the first push rod and rotated about the lever pin so as to move the moving rod in a direction to press the second brake shoe.

2. The drum brake device of claim 1, wherein the motor part comprises a motor shaft whose axial direction is parallel to the extension direction of the push rod part.

3. The drum brake device of claim 1, wherein the adjust assembly has a variable length to adjust a gap between the one end of the first brake shoe and the one end of the second brake shoe.

\* \* \* \* \*